United States Patent Office 2,947,607
Patented Aug. 2, 1960

2,947,607

METHOD OF PURIFYING SILICON BROMIDES CONTAMINATED WITH BORON BROMIDE AND SILICON IODIDES CONTAMINATED WITH BORON IODIDE

Franz Arthur Pohl, Belecke, Moehne, Germany, assignor to Licentia Patent-Verwaltungs-G.m.b.H., Hamburg, Germany No Drawing. Filed Feb. 26, 1958, Ser. No. 717,544

Claims priority, application Germany Feb. 26, 1957

9 Claims. (Cl. 23—205)

This invention relates to pure silicon halides as well as to a method for producing the same.

When silicon is to be used in electrically semiconductive arrangements such as rectifying devices, photoelectric elements, transistors and similar electrically, magnetically or light-controlled unsymmetrically conducting semiconductor systems, this chemical element must be produced well crystallized and preferably as monocrystals and with an extraordinary degree of purity.

To this end, it is known to thermically decompose silicon halides, eventually in the presence of hydrogen, and to obtain the elementary silicon in the form of crystal needles or in powder form. The conversion of silicon halides to elementary silicon has been described, for instance, by F. B. Litton and H. C. Anderson in "J. Electrochem. Soc." 101 (1954), pages 287–292, and by H. C. Theuerer in "Bell Lab. Rec." 33 (1955), pages 327–330.

After the silicon obtained in the manner described in these publications has been transformed into a polycrystalline or monocrystalline state, it still contains relatively considerably amounts of impurities which make it unsuited for use as a semiconductor. Therefore, the silicon material is made into rod shape and then subjected to repeated recrystallization according to the so-called zone-melting by creating a liquefied zone in the silicon rod and causing the same to wander through the rod body repeatedly. This process is described, for instance, by W. G. Pfann in "J. of Metals" (July 1952), pages 747–754.

However, experience has shown that in spite of these various known measures, it is still not possible to obtain elementary silicon of the desired highest degree of purity. In particular, the removal of boron from the silicon material is still completely unsatisfactory. This element of the third group of the Periodic Table according to Mendelyeev is electrically active in silicon, and, therefore, makes it impossible to control effectively and with full certainty the electrical properties of the produced silicon crystals. For these properties of the silicon crystals depend from the minimum total amount of boron present in the crystals as well as upon the random distribution of these amounts in the different parts of individual crystals. Quantities as small as $10^{-7}$ and $10^{-8}$ parts per part of silicon, and even smaller amounts of boron present in the silicon are sufficient to cause noticeable electrical disturbances and irregularities.

For the same reason, it was found to be ineffective and not sufficient to separate boron from silicon by the fractionated distillation of, for instance, silicon chlorides containing an admixture of traces of boron chlorides, or silicon bromides containing boron bromide as an impurity, or silicon iodides containing boron iodide as an impurity, prior to producing the elementary silicon from the respective halide.

It is, therefore, an object of my present invention to provide for a method for effectively purifying silicon halides from boron halides contained therein as impurities, with a view to obtaining a starting material for the subsequent production of elementary silicon which is virtually free from boron as an impurity.

It is more particularly an object of my invention to provide high purity silicon tetrabromide and tetraiodide which are virtually free from boron bromides and boron iodides, respectively, the aforesaid silicon tetrahalides thus constituting an excellent starting material for the production of silicon suited for use as semiconductive material due to being virtually free from traces of boron.

These objects are achieved by the method according to my invention which comprises the steps of treating a silicon bromide or silicon iodide with one or several at least partially chlorinated hydrocarbon substances, thereby converting the boron bromides or iodides present in traces in the silicon halide in question, into the corresponding boron chlorides, and separating the traces of the latter from the silicon halide by fractional distillation.

For I have found that the differences between the boiling points of silicon and boron halides, where the halogen is the same in both the silicon and the boron compound are insufficient, amounting to some 45 to 80 degrees centigrade at atmospheric pressure, to effect a complete enough separation to prevent traces of boron halide from remaining in the silicon halide containing the same halogen. Thus $SiBr_4$ boils at 153° C., and $BBr_3$ at 91° C., i.e. the temperature interval is only 62 degrees centigrade. $SiI_4$ boils at 290° C. and $BI_3$ at 210° C., the interval amounting to 80 degrees centigrade.

I prefer to use silicon tetrabromide or silicon tetraiodide as the silicon halide starting material in the method of purification according to my invention. The tetrahalide should be as free as possible of higher difficultly volatile silicon halides. Hereinafter, when using the term "silicon halide" in the specification and claims, I mean thereby only silicon bromide and silicon iodide.

I have found it to be of advantage to carry out the treatment of the silicon halide with chlorinated hydrocarbon or hydrocarbon mixture at elevated temperature between room temperature (20° C.) and the boiling point of the silicon halide, and to use an excess of the hydrocarbon substance.

The hydrocarbon material to be used should have a boiling point lower than that of the silicon halide being treated.

The conversion of boron bromide or boron iodide present in the silicon halide, to boron chloride may be effected with all at least partially chlorinated hydrocarbons, i.e. with hydrocarbons, the hydrogen atoms of which are partly or entirely substituted by chlorine atoms. I have found that those hydrocarbons are particularly effective, in which a part of the hydrogen atoms in the molecule are replaced by chlorine atoms, while all remaining hydrogen atoms are replaced by halogen atoms other than chlorine, i.e. either fluorine, bromine or iodine atoms.

By "hydrocarbons" I understand in this specification and the claims substances, the molecules of which consist exclusively of carbon and hydrogen atoms.

It is posible to use mixtures of at least partly chlorinated hydrocarbons, but I have found it to be advantageous in most cases to use a single partly or completely chlorinated hydrocarbon.

The method according to the invention is based on my discovery that the treatment of silicon halides as defined above with completely or partly chlorinated hydrocarbons at relatively moderate temperatures within the above stated range surprisingly effects a quantitative and rapid conversion of all boron bromide and boron iodide to boron trichloride, the other reaction product being a correspondingly brominated or iodinized hydrocarbon, while no noticeable attack took place on the silicon halide in question.

The method according to the invention is based on my discovery that the treatment of silicon halides as defined above with completely or partly chlorinated hydrocarbons at relatively moderate temperatures within the above stated range surprisingly effects a quantitative and rapid conversion of all boron bromide and boron iodide to boron trichloride, the other reaction product being a correspondingly brominated or iodinized hydrocarbon, while no noticeable attack took place on the silicon halide in question.

The use of preferably fully halogenated hydrocarbons constitutes an important, advantageous feature of my invention. The silicon halides often contain traces of bromine or iodine which would react with very incompletely halogenated hydrocarbons to form somewhat more halogenated hydrocarbons of less volatility. The formation of the latter compounds of higher boiling point would make it unnecessarily difficult to separate the purified silicon halide from the excess of hydrocarbon. The use of preferably partly chlorinated but completely halogenated hydrocarbons avoids this difficulty.

The boron trichloride formed during the treatment has a boiling point of 12.5° C. and, therefore, boils off completely at room temperature.

The remaining reaction mixture is then subjected to fractional distillation, the excess of chlorinated hydrocarbon is first evaporated at temperatures below the boiling point of the silicon halide, and the latter is then obtained as a distilled fraction, silicon tetrabromide being obtained at about 57.6° C., and silicon tetraiodide at 290° C., as the case may be.

The traces of brominated or iodinated hydrocarbons produced during the reaction are retained in the distillation residue.

At least partially chlorinated hydrocarbons suitable for use in the method of the invention have preferably at least partly chlorinated paraffinic or olefinic hydrocarbon molecules, the remaining hydrogen atoms of which are preferably completely replaced by other halogens. Among these substances, there are carbon tetrachloride, tetrachloroethylene, hexachloroethane, tetrachlorodifluoroethanes, monofluorotrichloromethane, trichlorotrifluoroethanes, monobromotrichloromethane, dibromodichloromethane, monofluoropentachloroethane, chloroform and similar substances, preferably having boiling points below that of the silicon halide being purified.

Carbon tetrachloride and tetrachloroethylene have been found to give most satisfactory results. If the silicon halide reaction mass contains free bromine or iodine apart from silicon bromides or iodides, this does not effect the outcome of the reaction, the free halogens becoming substituents in the chlorinated hydrocarbon reactant. The at least partly chlorinated hydrocarbons are added in excess to the silicon halide.

At least partly chlorinated aromatic hydrocarbons such as chlorinated benzenes having a boiling point in the range of 130–180° C. can also be used for the purification of silicon bromide or silicon iodide. The hydrocarbon derivatives must be free from oxygen. As a chlorinated benzene the 1,3-dichlorobenzene can be used.

According to a further mode of operation of the method according to the invention, the silicon halide obtained by the above-described steps can be further processed to obtain a boron-free elementary silicon of the highest purity. To this end, the resultant silicon halide is decomposed in a closed reaction vessel under sufficiently strong heating, for instance, by indirect high frequency induction heating under reduced pressure such as in a vacuum and eventually in the presence of a reduction agent such as hydrogen. The elementary silicon being set free in this manner, is preferably deposited on a movable receptor body, the speed of movement of which receptor is so controlled, that the silicon is deposited in the liquid state and forms a solid, for instance, rod-shaped body as it is moved out of the heated zone in the apparatus.

The formed silicon rod can then be further treated by the above mentioned zone-refining, described also by W. G. Pfann and K. M. Olsen in "Bell Lab. Rec." 33 (1955), pages 201–205.

Contact of the liquid silicon deposit with extraneous matter such as the walls of the reactor and the like, can be avoided by using as the receptor body a solid, crystalline silicon ingot.

This method of depositing silicon from the vapor phase is described, for instance, in the French Patent 1,125,277 to Siemens & Halske A.G.

Purification may preferably be continued to remove impurities other than boron by repeated fusion and recrystallization by zone-refining as described by P. H. Keck in "Physica" 20 (1954), No. 11, pages 1059–1065. It becomes thus possible to obtain a silicon of substantially improved degree of purity.

Thus far, no chemical analyses for traces are known to have a sufficient degree of sensitivity to determine $10^{-8}$ to $10^{-10}$ parts by weight of boron per part of silicon, since the reagents required in the known analytical methods such as sodium hydroxide contain boron impurities in higher concentrations than those mentioned above.

Electrical conductivity measurements employed for determining the amounts of boron present in silicon are equally unsatisfactory, since these methods can only determine total amounts of impurity centers present in silicon, and an actual amount of boron present may be disguised by the presence of other impurities of opposite conductivity.

The determination of the boron content in the silicon halides purified according to the method of my present invention, has been carried out with a new method.

This new method does not employ inorganic salts as reagents and thus avoids the contamination of the analytical reaction products with boron introduced with these salts. According to this new method, silicon crystals which have not been comminuted, are treated in an analytical apparatus made of quartz, with hot bromine vapors. The silicon bromide thus obtained is hydrolized together with the boron bromide contained therein and then separated by extraction with methanol and isopropyl ether. The extracted boric acid is determined photometrically with curcumin. In this manner, $10^{-9}$ parts by weight of boron per part of silicon can be determined with an exactness of ±10%.

Silicon crystals obtained from silicon bromide or silicon iodide purified according to the method of the present invention through the method described, for instance in the French patent supra, have been found, by the new analytical method mentioned above, to contain less than $10^{-9}$ parts of boron per part (by weight) of silicon. These extremely boron-free silicon crystals show an electrical resistivity of 500 to 2000 ohm-centimeters and a carrier life time from 200 to 600 microseconds.

The invention will be further illustrated by a number of examples which are, however, not intended to be limitative in any way.

Example I

In a quartz flask having a capacity of 1 liter, and having a ground-in socket for receiving therein a reflux condenser, 1000 grams (g.) of silicon tetrabromide are mixed thoroughly with 300 milliliters (ml.) of carbon tetrachloride, the reflux condenser is placed in the socket, and the flask is heated on a paraffin oil bath to about 50° C. for about 30 minutes. Gaseous $BCl_3$ formed during the heating step escapes through the reflux condenser. The reflux condenser is then exchanged against a fractionating column, the excess of carbon tetrachloride is distilled off at about 76.8° C. as first runnings, and the fraction of pure, boron-bromide-free silicon tetrabromide distilling at about 153° C. is then collected in a quartz recipient. Testing the silicon halide for the presence of boron according to the method described does not reveal any traces of the impurity.

*Example II*

In the same apparatus as used in the preceding example, 1000 g. of silicon tetrabromide are thoroughly mixed with 300 ml. of monofluorotrichloromethane $CFCl_3$ and then heated under a reflux condenser and on a paraffin oil bath during 30 minutes to about 50° C. After half an hour, the reflux condenser is replaced by a fractionating tower, the first runnings at about 24.1° C. consist of $CFCl_3$, and the fraction obtained at about 153° C. consists of pure, $BBr_3$-free silicon tetrabromide and is gathered in a quartz recipient.

*Example III*

The preceding example is repeated exactly, but with 1,1,1,2-tetrachlorodifluoroethane as the purifying agent. The first runnings, at 91.5° C. consist of the excess of the latter.

*Example IV*

Example I is repeated with 1,1,2,2-tetrachlorodifluoroethane as the purifying agent, the excess of which is fractionated as the first runnings at 92.8° C.

*Example V*

Example I is repeated with 1,1,2-trichloro-1,2,2-trifluoroethane as the purifying agent, the excess of which distills off as the first runnings at 47.7° C.

*Example VI*

A quartz flask having a capacity of 1.5 liters and a ground-in connecting socket is charged with 1000 g. of silicon tetraiodide and 700 ml. of monobromotrichloromethane $CBrCl_3$, the silicon halide is allowed to dissolve completely in the purifying agent, the quartz reactor is then connected to the fractionating column and the contents are slowly heated during about one hour to a temperature of 100° C. Heating is then continued more rapidly until $CBrCl_3$ distills off as the first runnings at 104.07° C. The fraction of pure, $BI_3$-free silicon tetraiodide is then obtained at 290° C. and is collected in a quartz recipient. $BCl_3$ formed from the traces of boron present in the original charge, is evaporated during the initial stages of the treatment, its boiling point being below room temperature.

*Example VII*

Example VI is repeated under exactly the same conditions as the amounts and temperatures of treatment, but dibromodichloromethane $CCl_2Br_2$ is used as the purifying agent, and the excess thereof is distilled off as the first runnings at 133° C.

*Example VIII*

Example VI is repeated with tetrachloroethylene as the purifying agent, the excess of which distills off as first runnings at 121.2° C.

*Example IX*

Example VI is repeated, but with pentachloromonofluoroethane $CCl_3.CCl_2F$ as the purifying agent. The excess of the latter distills off as first runnings at 137.9° C.

*Example X*

Example VI is repeated, but with hexachloroethane as the purifying agent, the excess of which is distilled off as first runnings at 187° C.

*Example XI*

Example VI is repeated with chloroform as the purifying agent. The temperature of the solution is gradually raised during about one hour to 60° C. whereupon, at 61° C. the excess of chloroform is distilled off. The remaining treatment is the same as in Example VI.

*Example XII*

A quartz flask having a capacity of 1 liter is filled with 1000 g. of silicon tetrabromide, 150 ml. of carbon tetrachloride and 150 ml. of chloroform, the liquids are thoroughly mixed by shaking, a reflux condenser is mounted on the flask, and the mixture is then heated on a paraffin oil bath to 50° C. for about 30 minutes. The reflux condenser is then exchanged for a fractionating column, chloroform is distilled off as the first fraction at 61.3° C., carbon tetrachloride at 76.8° C. as the second runnings, and the main fraction is then obtained as pure, boron tribromide-free silicon tetrabromide at 153° C. This main fraction is gathered in a quartz recipient.

The boron tribromide originally contained in traces in the silicon tetrabromide is converted to boron trichloride which escapes already at room temperature and is contained in the first runnings of the fractionated column.

*Example XIII*

A quartz flask having a capacity of 1.5 liters and a ground-in connecting socket is charged with 1000 g. of silicon tetraiodide and 700 ml. of 1,3-dichlorobenzene $C_6H_4Cl_2$, the silicon halide is allowed to dissolve completely in the purifying agent, the quartz reactor is then connected to the fractionating column and the contents are slowly heated during about one hour to a temperature of 100° C. Heating is then continued more rapidly until $C_6H_4Cl_2$ distills off as the first runnings at 172° C. The fraction of pure, $BI_3$-free silicon tetraiodide is then obtained at 290° C. and is collected in a quartz recipient. $BCl_3$ formed from the traces of boron present in the original charge, is evaporated during the initial stages of the treatment, its boiling point being below room temperature.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What is claimed is:

1. A method of producing a boron-free silicon halide of the type described, comprising the steps of admixing to a boron containing silicon halide selected from the group consisting of silicon bromides containing boron bromide as an impurity and silicon iodides containing boron iodide as an impurity, at least one at least partly chlorinated hydrocarbon as a purifying agent having a boiling point lower than that of the silicon halide, reacting the same with the boron impurity in the silicon halide to form gaseous boron trichloride escaping from the reaction mixture and recovering the silicon halide, purified from accompanying boron, by fractional distillation of the reaction mixture.

2. A method according to claim 1, characterized in that the reaction is carried out under heating to a temperature above room temperature and below the boiling point of the silicon halide.

3. A method as described in claim 1, characterized by the use of an excess of the purifying agent.

4. A method as described in claim 1, characterized in that the purifying agent consists of at least one at least partly chlorinated, but completely halogenated hydrocarbon.

5. A method as described in claim 1, characterized in that the purifying agent consists of at least one completely halogenated, partly chlorinated paraffinic hydrocarbon.

6. A method as described in claim 1, characterized in that the purifying agent consists of at least one completely halogenated, partly chlorinated olefinic hydrocarbon.

7. A method as described in claim 1, characterized in that the purifying agent consists of carbon tetrachloride.

8. A method as described in claim 1, characterized in that the purifying agent consists of tetrachloroethylene.

9. A method of producing a boron-free silicon halide of the type described, comprising the steps of (a) preparing a mixture of a boron impurities-containing silicon halide selected from the group of silicon tetrabromide containing boron bromide as an impurity and silicon tetraiodide containing boron iodide as an impurity, and an excess of a completely halogenated, at least partly chlorinated aliphatic hydrocarbon having a boiling point below the boiling point of the silicon halide, (b) reacting the two substances together by heating to a temperature above room temperature and below the boiling point of the hydrocarbon, so as to form gaseous boron trichloride and drive the same off during the reaction, and then (c) subjecting the reaction mixture to fractional distillation to separate as first runnings the excess of hydrocarbon, and then as a higher fraction the purified boron-free silicon halide.

References Cited in the file of this patent

UNITED STATES PATENTS 2,812,235    Winslow _____ Nov. 5, 1957